(12) United States Patent
Hacking et al.

(10) Patent No.: US 8,392,728 B2
(45) Date of Patent: Mar. 5, 2013

(54) REDUCING IDLE LEAKAGE POWER IN AN IC

(75) Inventors: Lance Hacking, Austin, TX (US);
Belliappa Kuttanna, Austin, TX (US);
Rajesh Patel, Austin, TX (US); Ashish Choubal, Austin, TX (US); Terry Fletcher, Rancho Cordova, CA (US);
Steven S. Varnum, Tigard, OR (US);
Binta Patel, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 11/615,749

(22) Filed: Dec. 22, 2006

(65) Prior Publication Data
US 2008/0155280 A1 Jun. 26, 2008

(51) Int. Cl.
*G06F 1/26* (2006.01)
*G06F 1/32* (2006.01)

(52) U.S. Cl. ........ 713/300; 713/310; 713/320; 713/323; 713/324; 710/5

(58) Field of Classification Search .................. 713/300, 713/310, 320–324, 330, 340; 710/1, 5–6, 710/8, 10, 12, 14–15, 18, 36
See application file for complete search history.

(56) References Cited

U.S. PATENT DOCUMENTS

| 5,467,042 | A | | 11/1995 | Smith et al. |
| 5,600,841 | A | * | 2/1997 | Culbert .......................... 713/300 |
| 5,898,232 | A | * | 4/1999 | Reents et al. ................... 307/18 |
| 5,945,817 | A | | 8/1999 | Nguyen |
| 7,542,305 | B2 | * | 6/2009 | Petersen et al. ............... 361/785 |
| 2002/0135398 | A1 | | 9/2002 | Choi et al. |
| 2004/0093529 | A1 | * | 5/2004 | Devlin et al. ................. 713/300 |
| 2004/0236968 | A1 | | 11/2004 | Hill |
| 2005/0064829 | A1 | | 3/2005 | Kang et al. |
| 2005/0091629 | A1 | * | 4/2005 | Eisenstadt et al. .............. 716/13 |
| 2007/0079149 | A1 | * | 4/2007 | Sahu et al. .................... 713/300 |

FOREIGN PATENT DOCUMENTS

| CN | 1377137 A | 10/2002 |
| CN | 1871869 A | 11/2006 |
| CN | 101578563 A | 11/2009 |
| DE | 112007003113 T5 | 10/2009 |
| GB | 2456993 A | 8/2009 |
| WO | 2005/034546 A1 | 4/2005 |
| WO | 2008/079518 A1 | 7/2008 |

OTHER PUBLICATIONS

PCT, International Search Report and Written Opinion of the International Searching Authority, Application No. PCT/US2007/083036, mailed Jan. 23, 2008.

(Continued)

*Primary Examiner* — Fahmida Rahman
(74) *Attorney, Agent, or Firm* — Jordan IP Law, LLC

(57) ABSTRACT

A method to reduce idle leakage power in I/O pins of an integrated circuit using external circuitry. Initially, I/O pins on a package are subdivided into those that will also remain powered up and those that will power down during idle state. When a system enters a low power mode, a signal is sent to the external circuitry. The signal notifies the I/O pins that always remain powered up to notify the external circuitry to power down the other set of I/O pins.

4 Claims, 4 Drawing Sheets

OTHER PUBLICATIONS

Office action received for Chinese Patent Application No. 200780047697.6 mailed on Feb. 24, 2011, 15 pages, including 9 pages of English translation.

Office action received for Chinese Patent Application No. 200780047697.6 mailed on Jun. 22, 2010, 14 pages, including 7 pages of English translation.

International Preliminary Report on Patentability received for PCT Application No. PCT/US2007/083036, mailed on Jul. 2, 2009, 8 pages.

Office action received for Great Britain Patent Application No. 0909833.6 mailed on Sep. 9, 2011, 4 pages.

Office Action received for German Patent Application No. 11 2007 003 113.1, mailed on Jul. 18, 2012, four pages of office action including two pages of English translation.

Office Action received for the Great Britain Patent Application No. GB 0909833.6, mailed on Jul. 3, 2012, three pages.

Office Action received from Chinese Patent Application 200780047697.6, mailed on Jan. 31, 2012, 15 pages of OA including 8 pages of English Translation.

Office Action received from German Patent Application 11 2007 003 113.1, mailed on Jan. 30, 2012, 6 Pages of OA including 2 pages of English Translation.

* cited by examiner

REDUCING IDLE LEAKAGE POWER IN AN IC

BACKGROUND INFORMATION

The present disclosure generally relates to the field of electronics. More particularly, an embodiment of the invention relates to reducing leakage power in an integrated circuit (IC) device using an external agent.

Power consumption, both dynamic and leakage, is one of the major concerns of IC design. In particular, leakage power may be growing with each successive design generation. One popular power saving technique implemented in notebook computers is to use ICs that can operate in a state or mode of reduced work capability that leads to reduced power consumption.

Some processors can operate according to an internal core clock signal that can be on/off modulated. This is an example of processor clock "throttling" which temporarily puts the processor in a non-active mode, which, in turn significantly reduces processor power consumption. A broader set of power states or work capability modes have been defined to place the processor in various sleep states. In a sleep state, some or all of the computing and I/O functions of the processor are essentially shut down.

However, current designs generally place their I/Os on a separate voltage plane and leave them powered up at all times. The present disclosure addresses this and other issues in reducing idle leakage power to these I/Os that are powered up at all times.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

In current systems, software directs the system to reduce power to the core when entering sleep state. During sleep state, the voltage may be below retention and perhaps 0V. Current designs generally place their I/Os on a separate voltage plane and leave the I/Os powered up at all times. Thus, the I/Os always consume power and leak power. The present invention is a method of reducing power by cutting power to I/Os during times the package is in an idle state.

Figure 1:
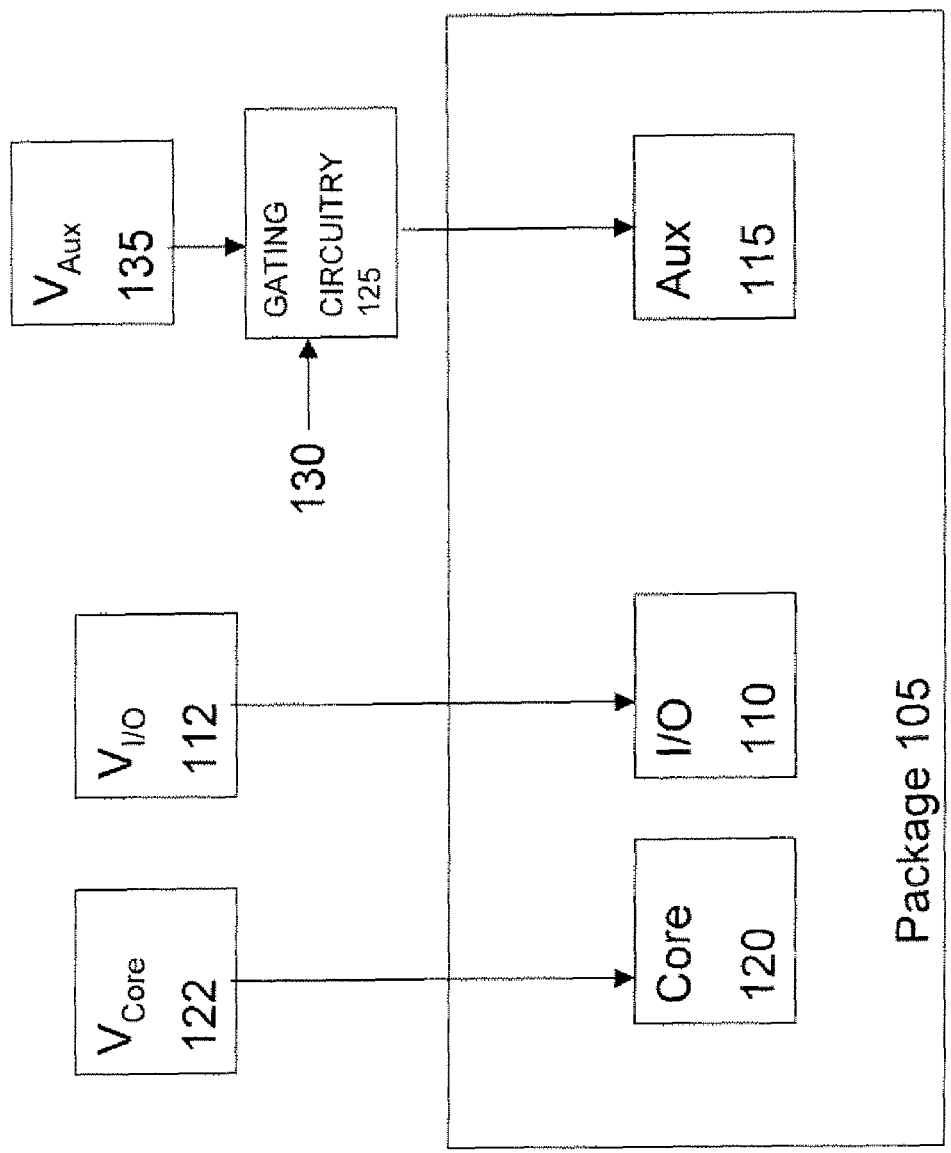
FIG. 1 illustrates a block diagram of an apparatus to reduce idle leakage power in an IC.

FIG. 1 illustrates a block diagram of an apparatus having an external agent to reduce idle leakage power in an IC. A package 105 may contain various circuitry. In particular, it may contain a core 120 and various I/O pins 110, 115. The core 120 is coupled to it own voltage source $V_{core}$ 122. The I/O pins are separated into those that remain on at all times 110 and those that may be powered down during idle state 115 when no bus activity is possible. Thus, the I/O pin Aux 115 is a subset of all the pins on the package 105.

For example, if the package 105 contained 200 I/O pins, 180 pins (115) would be turned off during sleep state and the other 20 I/O pins (110) would remain on at all times to wake up the other 180 pins AUX 115. The I/O pins each have their own voltage source $V_{I/O}$ 112 and $V_{aux}$ 135, respectively. It should be noted that the amount of I/O pins are for illustration purposes only and that this number may vary depending on the design of the system.

A chipset in a system is aware of the current state of the package 105. Thus, when the package enters a low power state, such as a sleep state, the chipset notifies external circuitry 125 to cut power to the I/O pins AUX 115 through a signal 130. This external circuitry may be an external FET. Upon exiting the sleep state, the chipset enables the external circuit through the signal 130 and voltage 135 to the I/O pins AUX 115 is restored.

Figure 2:
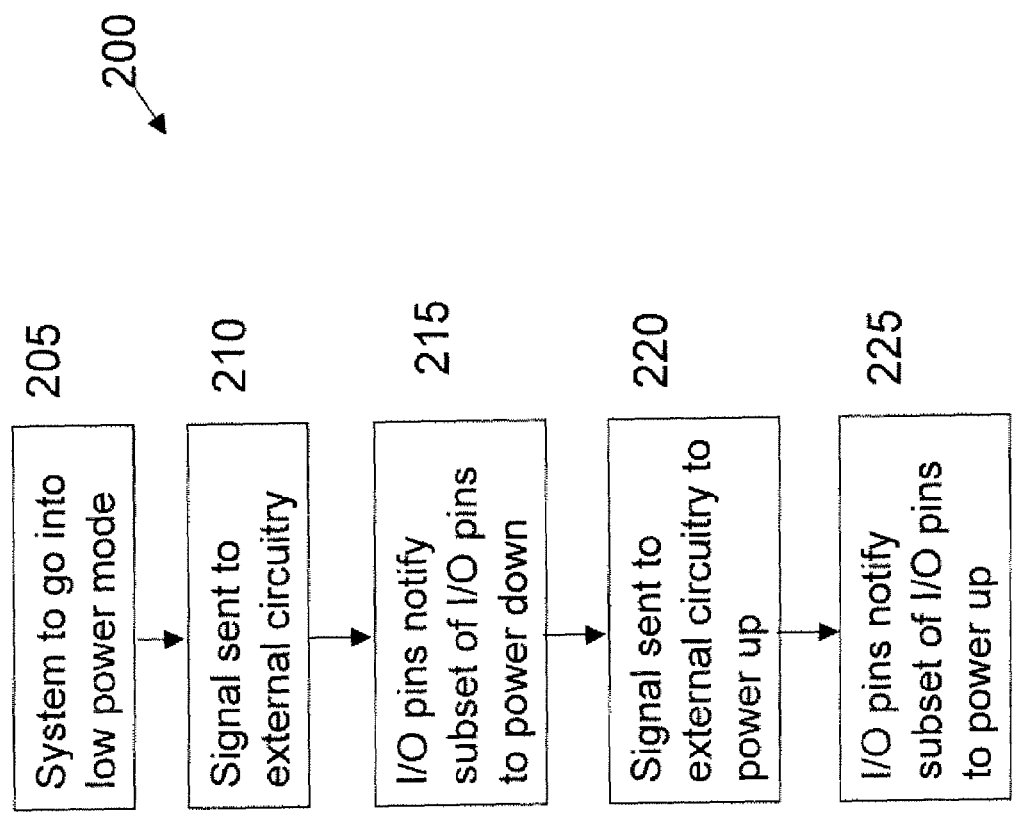
FIG. 2 illustrates a method of reducing idle leakage power in a IC.

FIG. 2 illustrates a method 200 of reducing idle leakage power. There are various ways on how the gating circuitry of FIG. 1 may be activated. Initially, an operating system or system high temperature or something similar makes a decision to go into low power mode, step 205. Once the decision is reached to go into low power mode, a signal is sent from a portion of the die to the external circuitry 210. It should be noted that the signal may be sent from places other than the die itself.

The portion of the I/O pins 110 that always remain on may notify the external circuitry to go ahead and cut off power to the subset of I/O pins AUX 115 upon receiving the signal 215. This signal could come from the I/O pins 110 or from another chip. For example, in one embodiment when the system goes into low power mode, the chipset is aware of the system mode, and the chipset notifies the gating circuitry.

Upon the system waking up from low power mode, a signal is sent from the chipset to the external circuitry to power up 220. Upon receiving the power up signal, the I/O pins 110 enables the external circuitry to power up the subset of I/O pins 115 upon receiving the signal 225.

The present implementation is discussed using external circuitry. However, an on die FET could also control turning on and off the I/O pins AUX 115. The control logic may be on the die, or generated from another die in the system.

Alternatively, the implementation of FIG. 1 may be extended to include other functional blocks that are traditionally left with voltage applied during idle states such as fuses and PLLs.

Accordingly, the coverage of this implementation may be board enough to cover traditional voltage planes to account for variance in voltage ramp time or required need for that resource. For example, although the operating system control indicates a core should be woken from an idle state, this may be done in stages to limit in-rush current.

This allows hardware, either internal or external to the device, to ramp voltage to various functions differently (at different times or different rates) in order to reduce in-rush current, increase energy efficiency, and leave off portions until demand dictates a need for that logic. Hardware could power up a die in stages to reduce in-rush current such as powering up a core at a time, or delaying restoring power to memory controllers and I/O until after core's have complete state restore.

Furthermore, hardware could delay restoring power to specialized functions until demand or performance dictated a need. A vector processing unit or last level cache (LLC) could remain powered up unbeknownst to software until hardware detects that those functions are required to meet performance or functional goals.

Figure 3:
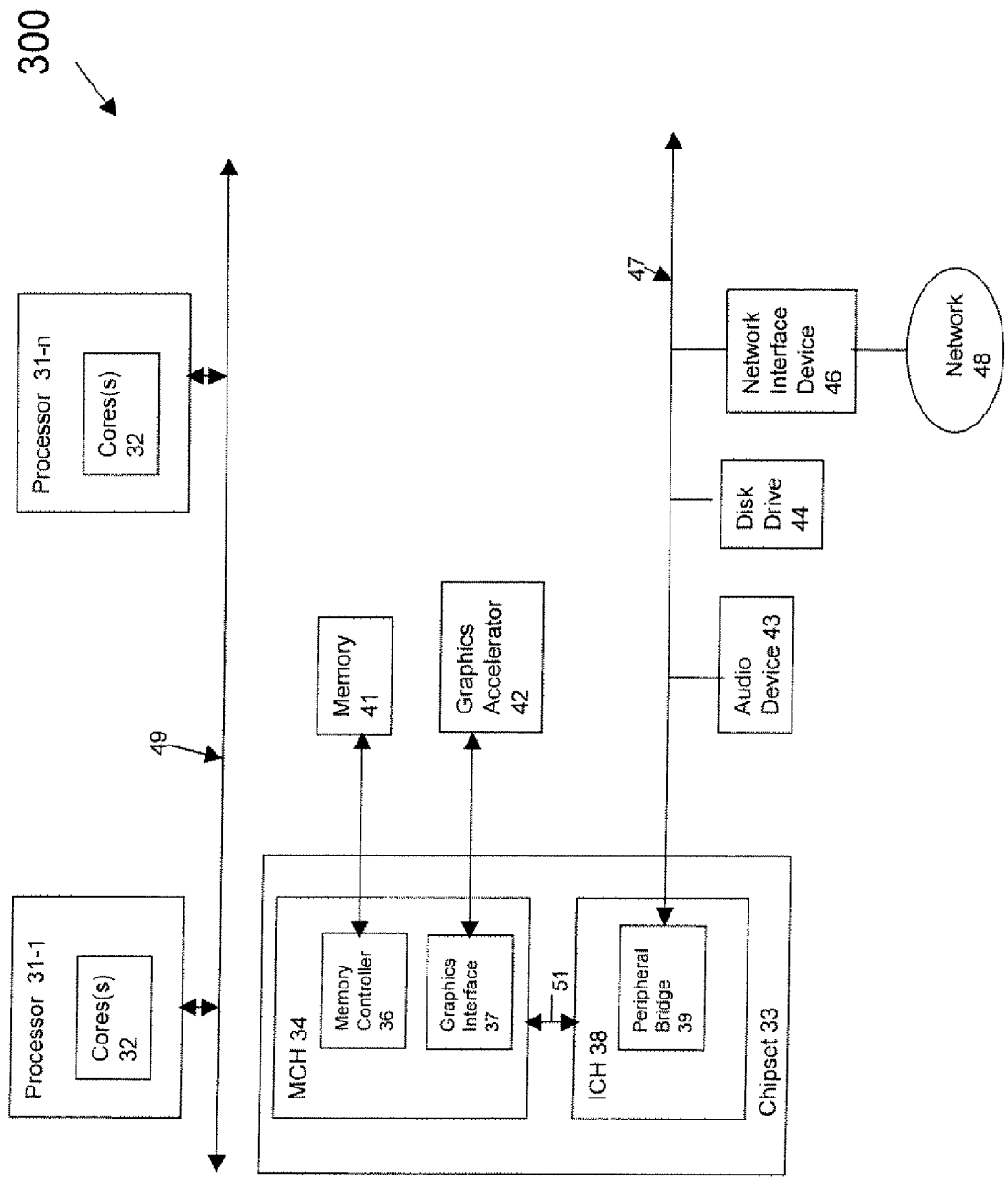
FIG. 3 is a block diagram of computer system in accordance with an embodiment of the invention.

FIG. 3 illustrates a block diagram of a computing system 300 in accordance with an embodiment of the invention. The computing system 300 may include one or more central processing units(s) (CPUs) 31 or processors that communicate via an interconnection network (or bus) 49. The processors 31 may be any type of a processor such as a general purpose processor, a network processor (that processes data communicated over a computer network 48, or other types of a processor (including a reduced instruction set computer (RISC) processor or a complex instruction set computer (CISC). Moreover, the processors 31 may have a single or multiple core design. The processors 31 with a multiple core design may integrate different types of processor cores on the same integrated circuit (IC) die. Also, the processors 31 may utilize the embodiments discussed with references to FIGS. 1 and 2. For example, one or more of the processors 31 may include one or more processor cores 32. Also, the operations discussed with reference to FIGS. 1 and 2 may be performed by one or more components of the system 300.

A chipset 33 may also communicate with the interconnection network 49. The chipset 33 may include a memory control hub (MCH) 34. The MCH 34 may include a memory controller 36 that communicates with a memory 41. The memory 41 may store data and sequences of instructions that are executed by the CPU 31, or any other device included in the computing system 300. In one embodiment of the invention, the memory 41 may include one or more volatile storage (or memory) devices such as random access memory (RAM), dynamic RAM, (DRAM), synchronous DRAM (SDRAM), static RAM (SRAM), or the like. Nonvolatile memory may also be utilized such as a hard disk. Additional devices may communicate via the interconnection network 49, such as multiple CPUs and/or multiple system memories.

The MCH 34 may also include a graphics interface 37 that communicates with a graphics accelerator 42. In one embodiment of the invention, the graphics interface 37 may communicate with the graphics accelerator 42 via an accelerated graphics poet (AGP). In an embodiment of the invention, a display (such as a flat panel display) may communicate with the graphics interface 37 through, for example, a signal converter that translates a digital representation of an image stored in a storage device such as a video memory or system memory into display signals that are interpreted and displayed by the display. The display signals produced by the display device may pass through various control devices before being interpreted by and subsequently displayed on the display.

A hub interface 51 may allow the MCH 34 to communicate with an input/output control hub (ICH) 38. The ICH 38 may provide an interface to I/O devices that communicate with components of the computing system 300. The ICH 38 may communicate with a bus 47 through a peripheral bridge (or controller) 39, such as a peripheral component interconnect (PCI) bridge, a universal serial bus (USB) controller, or the like. The bridge 39 may provide a data path between the CPU 31 and peripheral devices. Other types of topologies may be utilized. Also, multiple buses may communicate with the ICH 38, e.g. through multiple bridges or controllers. Moreover, other peripheral in communication with the ICH 38 may include, in various embodiments of the invention, integrated drive electronics (IDE) or small computer system interfaces (SCSI) hard drive(s), USB ports, a keyboard, a mouse, parallel port(s), serial port(s), floppy disk drive(s), digital output support (e.g., digital video interface (DVI)), or the like.

The bus 47 may communicate with an audio device 43, one or more disk drive(s) 44, and a network interface device 46 (which communicates with the computer network 48). Other devices may be in communication with the bus 47. Also, various components (such as the network interface device 46) may be in communication with the MCH 34 in some embodiments of the invention. In addition, the processor 31 and the MCH 34 may be combined to form a single chip. Furthermore, the graphics accelerator 42 may be included within the MCH 34 in other embodiments of the invention.

Furthermore, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 44) a floppy disk, a compact disk ROM (CD-ROM), a digital versatile disk (DVD), flash memory, a magneto-optical disk, or other types of nonvolatile machine-readable media capable of storing electronic instructions and/or data.

Figure 4:
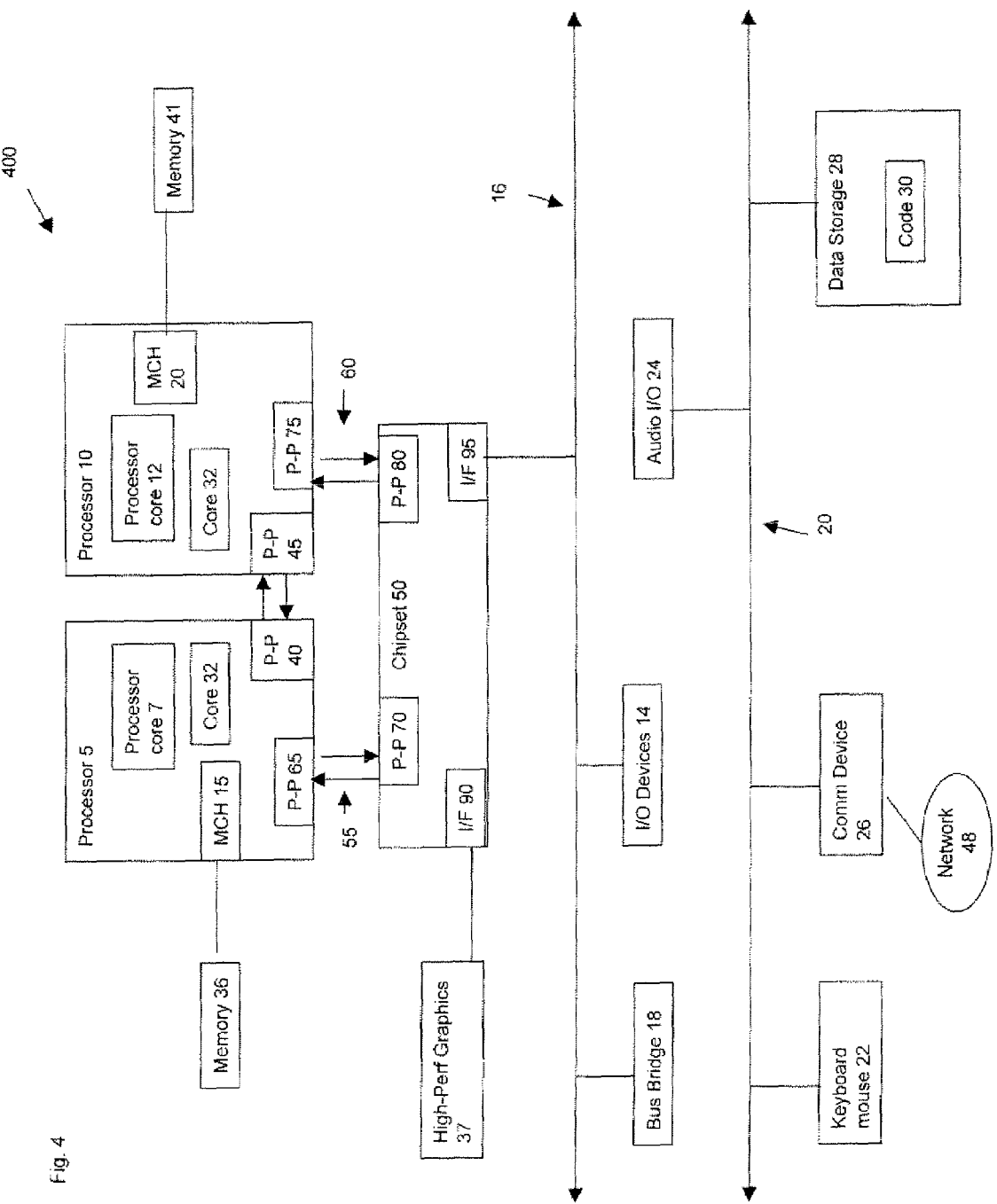
FIG. 4 is a block diagram of a computing system arranged in a point-to-point configuration, according to one embodiment of the invention.

FIG. 4 illustrates a computing system 400 that is arranged in a point-to-point (PtP) configuration, according to an embodiment of the invention. In particular, FIG. 4 shows a system where processors, memory, and input/output devices are interconnected by a number of point to point interfaces. The operations discussed with reference to FIGS. 1-3 may be performed by one or more components of the system 400.

As illustrated in FIG. 4, the system 400 may include several processors, of which only two, processors 5, 10 are shown for clarity. The processors 5, 10 may each include a local memory controller hub (MCH) 15, 20 to allow communication with memories 15, 20. The memories 15, and/or 20 may store various data such as those discussed with reference to the memory 512.

The processors 5, 10 may be any type of a processor such as those discussed with reference to the processors 31 of FIG. 3. The processors 5, 10 may exchange data via a point-to-point interface 93 using PtP interface circuits 40 and 45, respectively. The processors 5, 10 may each exchange data with a chipset 50 via individual PtP interfaces 55, 60 using point to point interface circuits 65, 70, 75, 80. The chipset 50 may also exchange data with a high-performance graphics circuit 37 via a high performance graphic interface 97, using a PtP interface circuit 90.

At least one embodiment of the invention may be provided within the processors 5, 10. For example, one or more of the processor core (s) 32 may be located within the processors 5, 10. Other embodiments of the invention, however, may exist in other circuits, logic units, or devices with the system 400 of FIG. 6. Furthermore, other embodiments of the invention may be distributed throughout several circuits, logic units, or devices illustrated in FIG. 4.

The chipset 50 may communicate with a bus 16 using a PtP interface circuit 95. The bus 16 may have one or more devices that communicate with it, such as a bus bridge 18 and I/O devices 14. Via a bus 20, the bus bridge 14 may be in communication with other devices such as a keyboard/mouse 22, communication devices 26 (such as modems, network interface devices, etc. that may be in communication with the computer network 48), audio I/O devices, and/or a data storage device 28. The data storage device 28 may store code 30 that may be executed by the processors 5 and/or 10.

In various embodiments of the invention, the operations discussed herein, e.g., with reference to FIGS. 1-4 may be implemented by hardware (e.g., circuitry), software, firmware, microcode, or combinations thereof, which may be provided as a computer program product, e.g., including a machine readable or computer readable medium having stored thereon instructions (or software procedures) used to program a computer to perform a process discussed herein. Also, the term "logic" may include, by way of example, software, hardware, or combinations of software and hardware. The machine readable medium may include a storage device such as those discussed with respect to FIGS. 1-4. Additionally, such computer readable media may be downloaded as a computer program product, wherein the program may be transferred from a remote computer (e.g., a server) to a requesting computer (e.g., client) by way of data signals embodied in a carrier wave or other propagation medium via a communication link (e.g., a bus, a modem, or a network connection). Accordingly, herein, a carrier wave shall be regarded as comprising a machine readable medium.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Also, in the description and claims, the term "coupled" and "connected", along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method of reducing idle leakage power in an integrated circuit, the method comprising:
    providing a voltage source interface to a core of the integrated circuit;
    providing a first set of input/output pins for the integrated circuit;
    providing a second set of input/output pins for the integrated circuit;
    receiving a signal indicating an idle state for the integrated circuit; and
    in response to receiving the signal indicating the idle state for the integrated circuit, reducing leakage power in the idle state by:
    maintaining power to the first set of input/output pins;
    using the first set of input/output pins to notify external circuitry to cut off power to the second set of input/output pins; and
    using the first set of input/output pins to notify the external circuitry to power up the second set of input/output pins upon receiving a power up signal from a chipset, wherein the external circuitry and the chipset are externally coupled to the integrated circuit;
        wherein the voltage source interface to the core, the first set of input/output pins, and the second set of input/output pins occupy separate voltage planes, and wherein the first and second sets of input/output pins conduct data.

2. The method of reducing idle leakage power in an integrated circuit of claim 1, further comprising:
    receiving a signal indicating a wake up from the idle state.

3. The method of reducing idle leakage power in an integrated circuit of claim 1, wherein the idle state corresponds to a state where no bus activity is expected.

4. The method of reducing idle leakage power in an integrated circuit of claim 1, further comprising:
    providing a first voltage source to the first set of input/output pins; and
    providing a second voltage source to the second set of input/output pins.

* * * * *

UNITED STATES PATENT AND TRADEMARK OFFICE
CERTIFICATE OF CORRECTION

| | | |
|---|---|---|
| PATENT NO. | : 8,392,728 B2 | Page 1 of 1 |
| APPLICATION NO. | : 11/615749 | |
| DATED | : March 5, 2013 | |
| INVENTOR(S) | : Hacking Lance et al. | |

It is certified that error appears in the above-identified patent and that said Letters Patent is hereby corrected as shown below:

On the Title page, in Item (75), in column 1, in "Inventors", line 2, delete "Belliappa Kuttanna" and insert -- Belliappa Kuttana --, therefor.

Signed and Sealed this
Twenty-sixth Day of November, 2013

Margaret A. Focarino
*Commissioner for Patents of the United States Patent and Trademark Office*